Feb. 2, 1932.  G. GRANDJEAN  1,843,669
COMBINATION TRUCK FRAME AND JOURNAL BOX CONSTRUCTION
Filed July 24, 1930   2 Sheets-Sheet 1
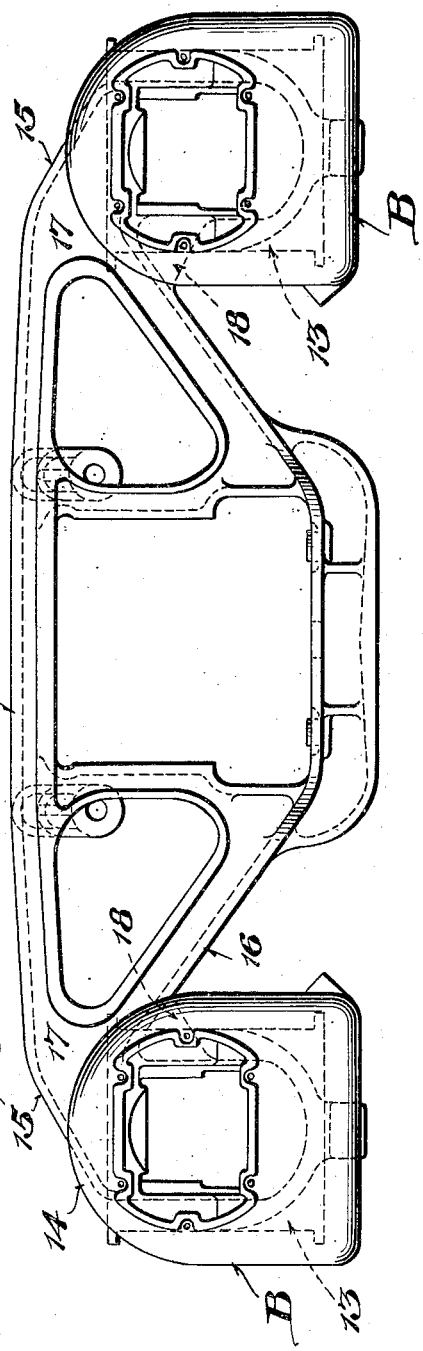
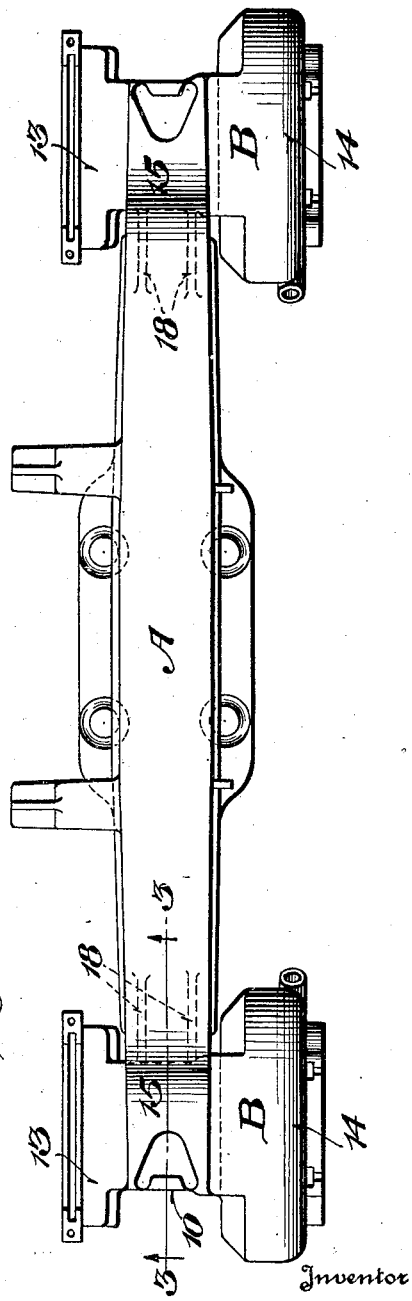
Inventor
Georges Grandjean
By D. P. Wolhaupter
Attorney

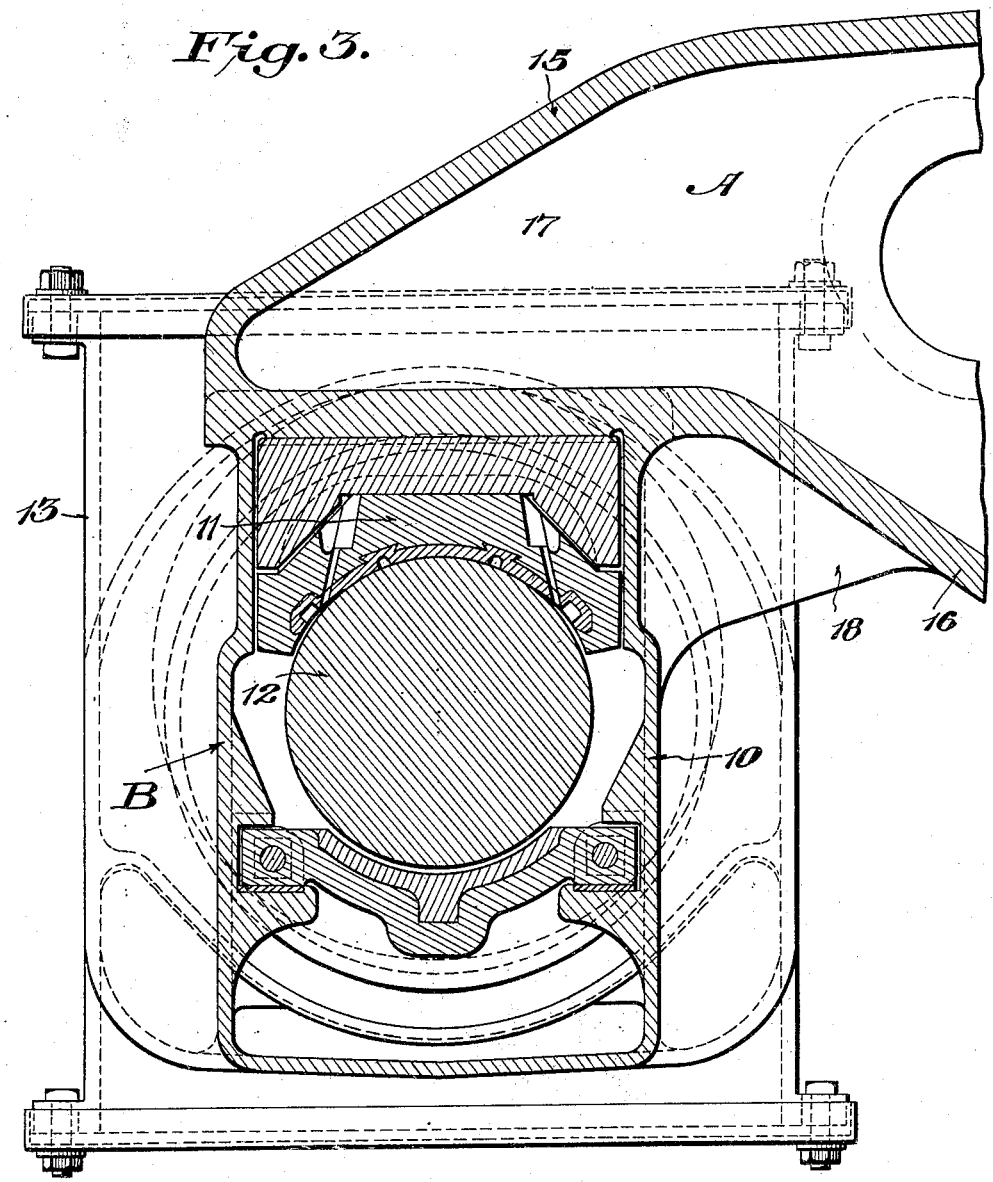

Patented Feb. 2, 1932

1,843,669

UNITED STATES PATENT OFFICE

GEORGES GRANDJEAN, OF NEW YORK, N. Y., ASSIGNOR TO ISOTHERMOS CORPORATION, OF NEW YORK, N. Y., A CORPORATION OF DELAWARE

COMBINATION TRUCK FRAME AND JOURNAL BOX CONSTRUCTION

Application filed July 24, 1930. Serial No. 470,524.

This invention relates to truck structures for railway vehicles, and has in view to secure certain practical advantages, especially from a manufacturing and installation standpoint, by providing a novel combination between a truck frame and a journal box, particularly a box of the type in which lubrication of the axle journal and its bearing is effected by means of a paddle or its equivalent carried by the axle for rotation therewith so as to dip into oil contained in the bottom of the box and to elevate oil to the bearing.

Heretofore, it has been the usual practice to form journal boxes of the type mentioned separate from the truck frame and to bolt said boxes to the truck frame, the boxes as a rule either fitting between the jaws of a frame pedestal or into a frame of the so-called arch-bar type.

The limitations as to available journal box space imposed by standard requirements of certain railroads in respect to truck frames often have interfered with the use of self-lubricating journal boxes of the general type mentioned with the truck frames of such railroads, necessitating various undesirable modifications in the journal boxes detracting from their efficiency. For example, the journal box must clear the bolts on each side of the box which hold the box to the frame, and inasmuch as the space between the bolts is limited, the box thus is limited as to width, which may not be as great as is desirable or as is necessary for entirely correct design and most efficient operation of a box of the type under consideration.

This, of course, applies particularly to the central portion of the box, but for one reason or another the box may be restricted as to width at its ends, necessitating the use of an obturating ring of less diameter than is desired and perhaps requiring the ring to be placed at other than a desired point on the axle. Moreover, the same undesirable requirements may be imposed with respect to the oil paddle or dipper which usually is mounted on the end of the axle for rotation within a chamber at the front of the box, any necessary restriction as to the width of the chamber obviously imposing a restriction as to the length of the paddle or dipper.

Accordingly, the object of the present invention is to provide a construction whereby the foregoing disadvantages, and others of a more or less similar nature, may be avoided, thus to permit a journal box of entirely correct design to be employed in practically any instance.

It has been found that the object of the invention may be accomplished by forming the journal box integral with the frame, as in this way more available space may be occupied by the box than according to any other construction. Accordingly, the invention in its broader aspects resides in casting or otherwise forming a truck frame and a journal box of the self-lubricating type in one piece, and by so doing it has been found that not only is a considerable saving in metal effected, but the total weight of the truck is correspondingly reduced.

In forming a journal box in one piece with a track frame, an important consideration is to provide requisite strength between the journal box and the frame, and the present invention has further in view to accomplish this in a simple yet highly efficient and satisfactory manner by disposing the box in a certain definite relation relative to the frame, and by providing reinforcing webs at certain definite points relative to the box and the frame, where they perform their function in a most efficient manner.

With the foregoing and other purposes in view, the invention consists in the novel features of construction, combination and arrangement of parts as will be hereinafter more fully described, illustrated in the accompanying drawings and defined in the appended claims.

In the drawings, wherein like characters of reference denote corresponding parts in the different views:

Fig. 1 is a side elevation of a truck frame having journal boxes of the self-lubricating type cast integral therewith in accordance with the present invention.

Fig. 2 is a top plan view of the structure shown in Fig. 1; and

Figure 3 is an enlarged section on the line 3—3 of Figure 2.

Referring now to the drawings in detail, a truck frame of known general design is designated as A and the journal boxes thereof as B, these latter also being of a known general design. In other words, it is well known to those skilled in the art that a so-called self-lubricating journal box usually is inclusive of a central portion of relatively narrow width and height within which is contained a bearing against which the axle journal seats, and that the box is enlarged at its front and rear to accommodate an oil elevating paddle and an oil obturating ring, respectively, which are mounted on the axle for rotation therewith, the obturating ring being designed to prevent escape of oil from the box through the opening in the rear thereof through which the axle extends, and the paddle being designed to elevate oil from the bottom of the box to the bearing. The present box is of this general design, and since such design is well known, it has been deemed unnecessary to illustrate any more of the details thereof than are necessary for a clear understanding of the invention. Accordingly, the box B is shown merely as comprising a central portion 10 of relatively narrow height and width containing a bearing 11 against which the axle 12 is journaled, and enlarged end portions 13 and 14, respectively, to accommodate the oil obturating ring and the paddle which are not shown.

In combining the box B in a one-piece structure with the frame A, the end portion at least of the frame is formed of a width to extend between the front and rear enlargements 13 and 14 and to join directly with the central box portion 10, whereby the said enlarged portions 13 and 14 may extend laterally in overlapping relation to the frame to any extent desired within maximum prescribed limits, which usually are such that if the box is arranged with respect to the frame in the manner stated, ample space is afforded to enable the box and particularly the parts 10, 13 and 14 thereof to be formed of desired maximum size.

The frame A is illustrated in the present instance as of hollow construction and inclusive at its ends of top and bottom walls 15, and 16, respectively joined by side walls 17. The top wall 15 is extended upwardly from the top of the box portion 10 adjacent to the outer side of said box portion. On the other hand, the frame bottom wall 16 extends laterally from the inner side adjacent to the top of the box portion 10, while, as heretofore stated, the frame side walls 17 join the top of the box portion 10 between the enlarged end portions 13 and 14 thereof. In this way the box is held rigidly connected with the frame against being broken therefrom by force exerted against the box in practically any direction. However, to further increase the strength of the union between the box and the frame, vertical reinforcing webs 18, 18 are formed to extend between the bottom frame wall 16 and the inner side wall of the box. These webs are located adjacent to the side wall 17 and 17, respectively, and serve, as is obvious, as compression and tension members not only to take stresses longitudinally of the frame and transversely of the box, but also to take stresses tending to rotate the box in a horizontal plane relative to the frame, whereby any danger of the box being broken away from the frame under any ordinary conditions is practically eliminated.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In combination, a truck frame, and a journal box formed in one piece with said truck frame, said journal box being inclusive of a central portion of relatively narrow width and being enlarged at its ends to provide chambers to receive an oil obturating ring and an oil elevating paddle, the frame being of a width where joined to the box to extend between the enlarged end portions of the box and being joined with the relatively narrow central portion of the box.

2. In combination, a truck frame, and a journal box formed in one piece with said truck frame, the frame being joined to the central portion of the box and the latter being inclusive of an enlarged end portion extending in overlapping relation to an adjacent side portion of the frame.

In testimony whereof I hereunto affix my signature.

GEORGES GRANDJEAN.